United States Patent [19]

Komiya

[11] Patent Number: 5,771,554
[45] Date of Patent: Jun. 30, 1998

[54] PARTS ASSEMBLING EQUIPMENT AND PROCESS

[75] Inventor: Shigenobu Komiya, Toyota, Japan

[73] Assignee: Toyota Jidosha Kabushiki Kaisha, Toyota, Japan

[21] Appl. No.: 674,801

[22] Filed: Jul. 3, 1996

[51] Int. Cl.⁶ .................................................. B23P 21/00
[52] U.S. Cl. .............................................. 29/430; 29/711
[58] Field of Search .............................. 29/430, 711, 783, 29/784, 786, 787, 793, 794, 795; 198/348, 346, 346.1, 346.2

[56] References Cited

U.S. PATENT DOCUMENTS

| | | | |
|---|---|---|---|
| 3,845,286 | 10/1974 | Aronstein et al. | 29/430 X |
| 4,027,246 | 5/1977 | Caccoma et al. | 29/430 X |
| 4,069,764 | 1/1978 | Teyssedre | 29/430 X |
| 4,719,694 | 1/1988 | Herberich et al. | 29/711 X |
| 4,815,190 | 3/1989 | Haba, Jr. et al. | |
| 4,884,330 | 12/1989 | Sticht | 29/430 |
| 5,271,139 | 12/1993 | Sticht | 29/784 X |
| 5,347,700 | 9/1994 | Tominaga et al. | |

FOREIGN PATENT DOCUMENTS

| | | |
|---|---|---|
| 4411600 | 10/1985 | Germany . |
| 3614165 | 10/1987 | Germany . |

OTHER PUBLICATIONS

Patent Abstract of Japan, vol. 13, No. 446(M–877) re JP–A 01172078, Oct. 1989.

"Automated Assembly Process Material Handling System", IBM Technical Disclosure Bulletin, vol. 31 No. 1 Jun. 1988 pp. 30–34.

*Primary Examiner*—Daniel Moon
*Attorney, Agent, or Firm*—Cushman Darby & Cushman IP Group of Pillsbury Madison & Sutro LLP

[57] ABSTRACT

In an assembling line for assembling parts successively on engine base being moved on a conveyor, the conveyor comprises a plurality of conveyor divisions. Between two adjacent, i.e., preceding and succeeding, conveyor divisions, a self-running vehicle is provided, which receives an engine base with parts assembled thereon in the preceding conveyor division and parts to be assembled in the succeeding conveyor division and supplies the received work and parts to the succeeding conveyor division.

10 Claims, 3 Drawing Sheets

PARTS ASSEMBLING EQUIPMENT AND PROCESS

BACKGROUND OF THE INVENTION

1. Field of the Invention

This invention relates to parts assembling equipment and process used for production activities of a plurality of workers to assemble a plurality of parts successively on a base work to obtain a complete product.

2. Description of the Prior Art

Prior art parts assembling equipment and process in which a plurality of workers assemble a plurality of parts successively on a base work, are as follows.

A straight conveyor (or conveying path) is provided. A plurality of workers are disposed along the conveyor, and parts shelves are disposed on the back side of the workers. Engine bases, for instance, are fed on the conveyor, and the workers assemble predetermined parts taken out of the parts shelves successively on each engine base. As the plurality of workers assemble parts in charge of them, all the necessary parts are assembled on the engine base, and thus an engine is completed.

The above parts assembling equipment (or process), however, has the following drawbacks.

Usually, the conveyor length is set to cope with the maximum production. A period of reduction in production is coped with by reducing the conveyor speed and increasing the number of parts to be assembled per worker. By so doing, the number of necessary workers can be reduced in correspondence to the reduction in production. In such a case, the assembling can be completed without using the entire length of the conveyor. That is, part of the conveyor is unnecessary. If such unnecessary conveyor part can be disconnected, it may be put to maintenance for future use or to line modification operations to meet a scheduled production model change, if any. Up to date, however, it is impossible to disconnect the unnecessary conveyor part for the above purposes.

In another aspect, for completing an engine from an engine base, it is necessary to assemble a large number of parts on the engine base. Such a large number of parts cannot all be conveyed together with the engine base on the conveyor. Therefore, the individual workers have to take out parts to be assembled by themselves from the parts shelves on their back side, which takes an additional time.

SUMMARY OF THE INVENTION

An object of the invention is to provide parts assembling equipment which permits part of a conveying path to be held inoperative or disconnected during a period of reduction in production.

Another object of the invention is to provide parts assembling equipment and process which permit parts to be assembled to be conveyed and supplied to workers together with a work for assembling the parts thereon.

A further object of the invention is to provide parts assembling equipment which can ensure high degree of freedom of the conveying path layout design.

A still further object of the invention is to provide an assembling technique which does not require workers to take out any part from any parts shelf.

In the parts assembling equipment according to the invention, a conveying path is formed by combining a plurality of conveying path divisions. The conveying path divisions are sequenced in order, and a work is conveyed from one conveying path division to the other conveying path division in this order. Each conveying path division has a leading end and a trailing end. Between the trailing end of a preceding conveying path division and the leading end of a succeeding conveying path division, an inter-conveying path division conveying means is provided. The inter-conveying path division conveying means receives the work on which parts have been assembled in the preceding conveying path division, and conveys this received work from the trailing end of the preceding conveying path division to the leading end of the succeeding conveying path division and conveys other parts to be assembled thereon in the succeeding conveying path division to the leading end thereof.

With this arrangement, it is possible to hold some of the conveying path divisions inoperative or disconnected during a period of reduction in production. In addition, workers do not have to take out any part from any parts shelf.

The present invention will be more fully understood from the following detailed description and appended claims when taken with the accompanying drawings.

DETAILED DESCRIPTION OF THE PREFERRED EMBODIMENTS

First Embodiment

Figure 1:
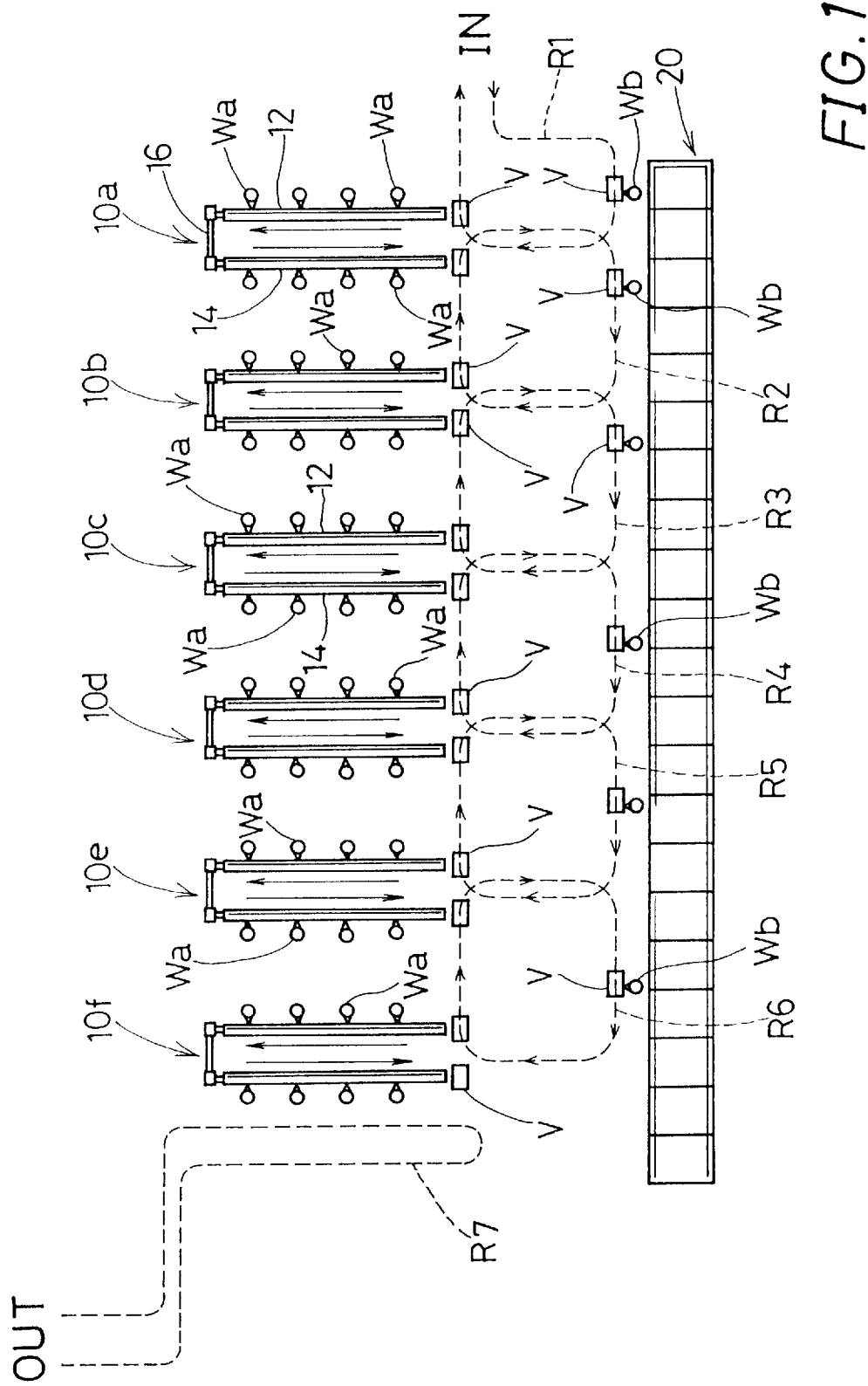
FIG. 1 is a schematic plan view showing a first embodiment of the invention.

A first embodiment of the Invention will now be described with reference to FIG. 1.

This embodiment comprises six, i.e., first to sixth, conveyor divisions (or conveying path divisions) 10a to 10f (or simply referred to as 10). Each of the conveyor divisions 10a to 10f is substantially channel-shaped, and include a forward section 12, a backward section 14, these sections 12 and 14 being provided as a pair, and a transfer section 16 provided between the two sections 12 and 14. The forward section 12, backward section 14 and transfer section 16 are all in the form of a roller conveyor.

Pallets (not shown) are placed on the leading end (i.e., lower end as viewed in the drawing) of the forward section 12, then conveyed toward the transfer section 16 (i.e., upward as viewed in the drawing), then transferred by the transfer section 16 over to each backward section 14, and then conveyed toward the trailing end (i.e., downward as viewed in the drawing) of the backward section 14.

Workers Wa, i.e., four workers in the illustrated example, are stationed along each of the forward and backward sections 12 and 14.

A parts stockyard 20 is provided for all the conveyor divisions 10a to 10f, and accommodates parts to be assembled on engine bases.

An automatic conveying wagon running zone is defined between the set of conveyor divisions 10a to 10f and the parts stockyard 20, and includes a first conveying route R1, a second conveying route R2, . . . , a sixth conveying route R6. Automatic conveying wagons V are adapted to be self-run along the individual conveying routes R1 to R6.

The first conveying route R1 is led from an engine base supplying section IN via the parts stockyard 20 (to be exact, the neighborhood thereof, this being so as well in like cases appearing hereinunder) and the leading end of the first conveyor division 10a and back to the engine base supplying section IN.

The second conveying route R2 is led from the trailing end of the first conveyor division 10a via the parts stockyard 20 and the leading end of the second conveyor division 10b back to the trailing end of the first conveyor division 10a. The third to sixth conveyor routes R3 to R6 connect the trailing end of an n-th (n being 2 to 5) conveyor division (10), the parts stockyard 20, and the leading end of an (n+1)-th conveyor division (10). Each conveying means (i.e., self-running vehicle V running along each of the routes R1 to R6) leaves the trailing end of the preceding conveyor division and arrives at the leading end of the succeeding conveyor division via the parts stockyard.

At the parts stockyard 20, workers Wb are each stationed for each of the first to sixth conveying routes R1 to R6.

Three self-running vehicles V are stationed for each of the second to sixth routes R2 to R6.

The seventh route R7 connects an engine testing yard OUT and the trailing end of the sixth conveyor division 10f.

The operation of this embodiment will now be described.

Each self-running vehicle V conveys a pallet and an engine base (work) put thereon from the engine base supplying section IN along the first conveying route R1 to the parts stockyard (i.e., the right end thereof as viewed in the drawing). The worker Wb puts parts to be assembled in the first conveyor division 10a on the pallet. The parts to be assembled In the first division 10a are hereinafter referred to as first conveyor division parts, this being so as well in like cases appearing hereinafter. The self-running vehicle V then runs to the leading end of the first conveyor division 10a. At the leading end of the first conveyor division 10a, the worker Wa transfers the pallet with the engine base and first conveyor division parts thereon onto the first conveyor division 10a.

While the pallet is moved along the first conveyor division 10a, the workers Wa assemble the first conveyor division parts successively on the engine base. At the trailing end of the first conveyor division 10a, the engine base with the first conveyor division parts assembled thereon is transferred by the worker Wa onto a self-running vehicle V that runs along the second conveying route R2.

This self-running vehicle V then runs along the second conveying route R2 to the parts stockyard 20. At this position, the worker Wb puts second conveyor division parts on the pallet. The self-running vehicle V runs to the leading end of the second conveyor division 10b. At this position, the engine base with the first conveyor division parts assembled thereon and the second conveyor division parts are transferred together with the pallet to the second conveyor division 10b.

While the pallet is conveyed along the second conveyor division 10b, the workers Wa thereof assemble the second conveyor division parts successively. Thereafter, the partially assembled work is transferred onto a self-running vehicle V that runs along the third conveying route R3.

In the above way, the engine base with the first to n-th (n being 1 to 5) conveyor division parts assembled thereon is transferred together with the pallet by the self-running vehicle V from the trailing end of the n-th conveyor division (10) to the parts stockyard 20. Then, (n+1)-th conveyor division parts are supplied to the pallet and conveyed to the leading end of the (n+1)-th conveyor division (10). The engine base with the previous parts assembled thereon and the (n+1)-th conveyor division parts are transferred together with the pallet onto the leading end of the (n+1)-th conveyor division (10), and the (n+1)-th conveyor division parts are assembled successively while they are conveyed along the (n+1)-th conveyor division (10).

In the above away, before reaching the trailing end of the sixth conveyor division 10f, all the parts are assembled on the engine base, thus completing the engine. The completed engine is conveyed together with the pallet by a self-running vehicle V that runs along the seventh conveying route R7 to the engine testing yard OUT. Thereafter, the same self-running vehicle V conveys an empty pallet to the trailing end of the sixth conveyor division 10f.

The above individual operations are all done concurrently.

As shown above, in this embodiment, the engine base is conveyed, together with parts to be assembled, to the workers Wa who do assembling operations. The workers Wa thus do not have to procure the parts by themselves, so that the operation efficiency can be improved. This is attained by the arrangement that the conveyor (or conveying path) is divided into the first to sixth conveyor divisions (or conveying path divisions) 10a to 10f so that the parts to be assembled in each of the conveyor divisions 10a to 10f can be conveyed together with the engine base (or work).

This embodiment in which the conveyor (i.e., conveying path) is divided into the first to sixth conveyor divisions 10a to 10f, further has the following effects.

When reducing the engine production rate, the first to sixth conveyor divisions 10a to 10f may not all be used, but only the first to third conveyor divisions 10a to 10c may be used. In such a case, parts per engine to be conveyed on the self-running vehicles V for the first to third conveying paths are increased while reducing the speed of the conveyor divisions 10a to 10c, and a greater number of parts are assembled by each worker Wa.

In this case, the fourth to sixth conveyor divisions 10d to 10f which are not used for the assembling of engines, may be put to maintenance or used for different assembling operations. For example, works and parts of a different type of engine may be supplied onto the leading end of the fourth conveyor division 10d, and self-running vehicles V between the fourth and fifth conveyor divisions 10d and 10e receive, at the trailing end of the fourth conveyor division, the works on which the parts have been assembled in the fourth conveyor division 10d. The self-running vehicles V also receive parts of that engine from the parts stockyard 20 and supply them to the leading end of the fifth conveyor division 10e. Then, like operations may be done between the fifth and sixth conveyor divisions 10e and 10f. In this way, it is possible to permit assembling of different types of engines at a time.

Another advantage of the embodiment is that since the first to sixth conveyor divisions 10a to 10f are disposed in parallel, it is possible to reduce the extent of the assembling equipment in the left-right direction as viewed in the drawing and to install the equipment in a limited space for use.

A further advantage of the embodiment is that since the first to sixth conveyor divisions 10a to 10f are closely spaced to each other and the leading end of the succeeding one and the associated trailing end of the preceding one are disposed in a closely spaced-apart relation to each other, it is possible to ensure efficient running of the self-running vehicles V from the trailing end of the n-th conveyor division (10) to the parts stockyard 20 and thence to the leading end of the (n+1)-th conveyor division (10) for supplying parts to be assembled.

Moreover, unlike the prior art, since each of the conveyor divisions 10a to 10f and the parts stockyard 20 are interconnected by the self-running vehicles V, it is not necessary to tentatively stock parts on parts stock shelves that may otherwise be provided along a conveyor, which is advantageous in view of the space saving.

Second Embodiment

Figure 2:
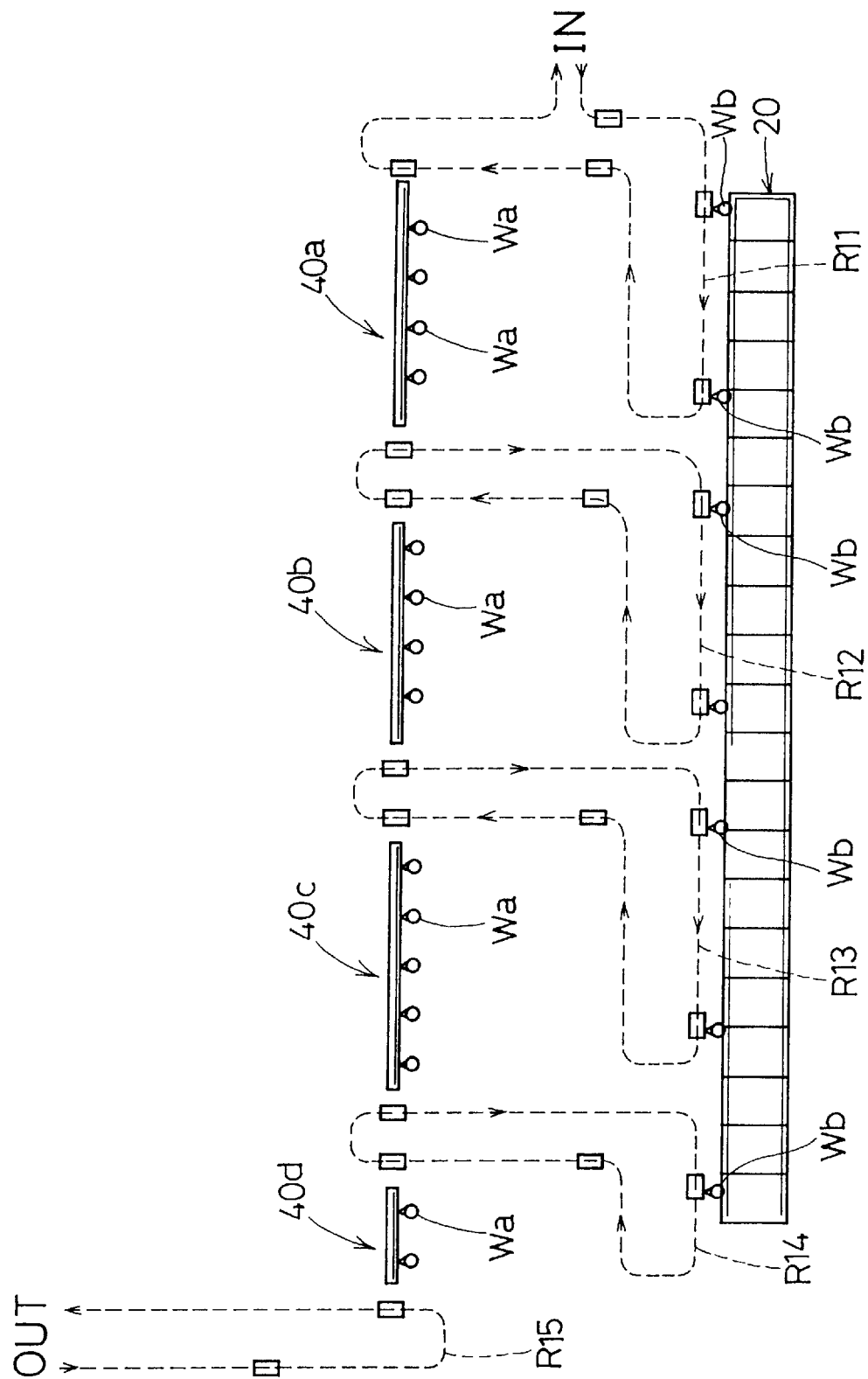
FIG. 2 is a schematic plan view showing a second embodiment of the invention.

A second embodiment of the invention will now be described mainly in connection with its difference from the first embodiment with reference to FIG. 2.

This embodiment comprises first to fourth conveyor divisions 40a to 40d disposed in series, i.e., in an end-to-end arrangement.

A self-running vehicle V conveys an engine base (or work) put on a pallet along a first conveying route R11 to a parts stockyard 20 (at the right end of the drawing). The worker Wb puts first conveyor division parts on the pallet. The self-running vehicle V then runs to the leading end of the first conveyor division 40a.

At the leading end of the first conveyor division 40a, the worker Wb transfers the pallet with the engine base and first conveyor division parts put thereon onto the first conveyor division 40a.

While the pallet is moved along the first conveyor division 40a, the first conveyor division parts are assembled successively by the workers Wa on the engine base. At the trailing end of the first conveyor division 40a, the engine base with the first conveyor division parts assembled thereon is transferred together with the pallet by the worker Wa onto a self-running vehicle V that runs along a second conveying route R12.

The self-running vehicle V then runs along the second conveying route R12 to the parts stockyard 20, at which second conveyor division parts are put by the worker Wb on the pallet. The self-running vehicle V runs to the leading end of the second conveyor division 40b. The engine base with the first conveyor division parts assembled thereon and second conveyor division parts, are then transferred together with the pallet onto the second conveyor division 40b.

While the pallet is moved along the second conveyor division 40b, the second conveyor division parts are assembled by the workers Wa successively. The partially assembled work is then transferred onto a self-running vehicle V that runs along a third conveying route R13.

In the above way, before reaching the trailing end of the fourth conveyor division 40d, all the parts are assembled on the engine base, thus completing the engine. The completed engine is conveyed together with the self-running vehicle V that runs along a fifth conveying route R15 to an engine testing yard OUT. Subsequently, the self-running vehicle V conveys an empty pallet to the trailing end of the third conveyor division 40c.

According to this embodiment, since the conveyor divisions 40a to 40d are disposed in series, the equipment is elongated in overall configuration and is thus suited for installation in an elongate space.

Third Embodiment

Figure 3:
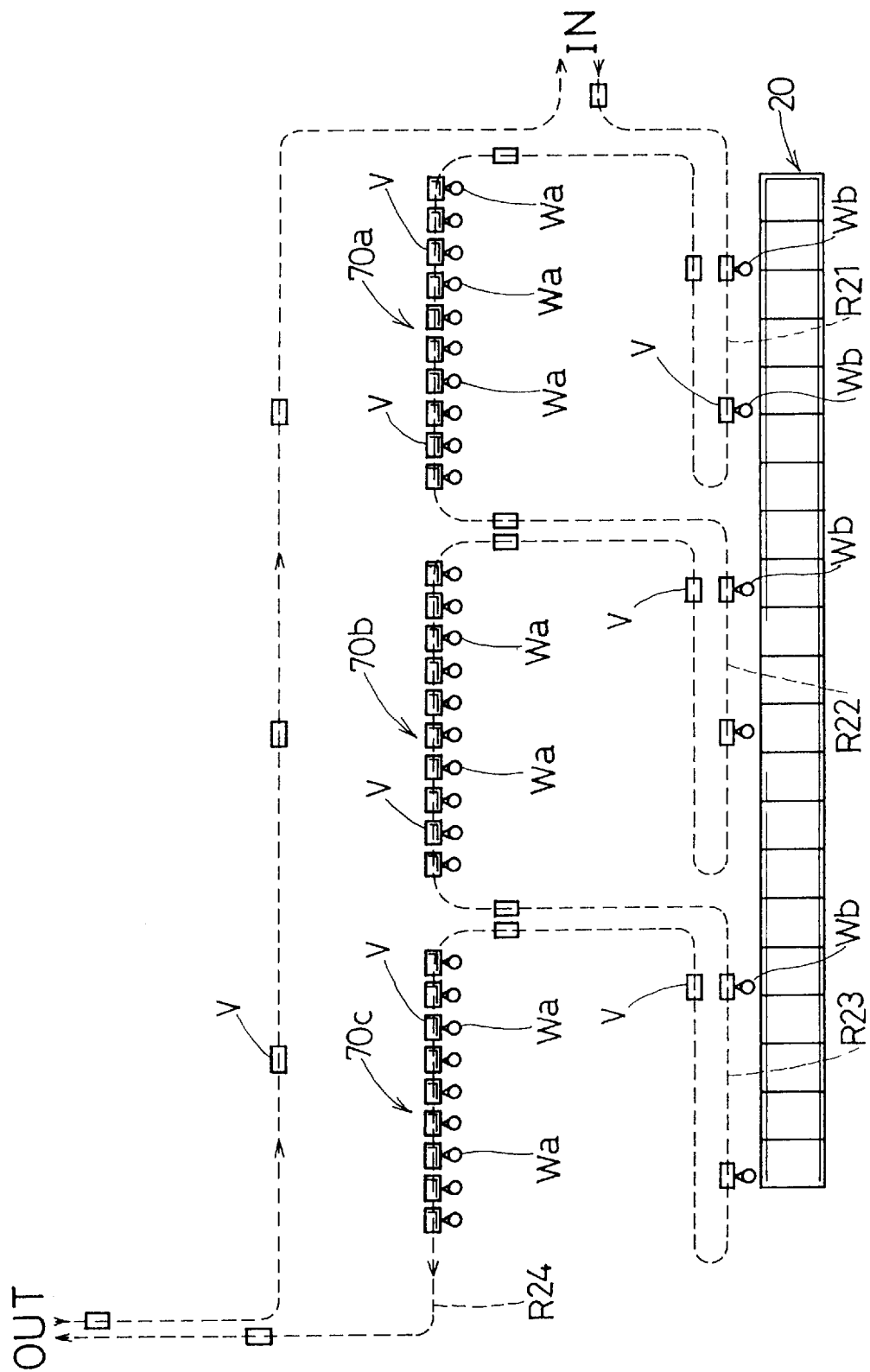
FIG. 3 is a schematic plan view showing a third embodiment of the invention.

A third embodiment of the invention will now be described mainly in connection with its difference from the first and second embodiments with reference to FIG. 3.

This embodiment has first to third conveying path divisions which are not constituted by any roller conveyor. Instead, these conveying path divisions are constituted by respective first to third self-running vehicle trains 70a to 70c each of ten self-running vehicles V. The self-running vehicles V in the self-running vehicle trains 70a to 70c and those V running along conveying routes R21 to R24 are the same, and the self-running vehicles V are replaced with each other as they are successively moved. One worker Wa is stationed at each of the self-running vehicles V in the self-running vehicle trains 70a to 70c.

A self-running vehicle V conveys an engine base (i.e., work) put on a pallet from an engine base supplying section IN along the first conveying route R21 to the parts stockyard 20 (shown at the right end in the drawing). The worker Wb puts first conveying path division parts on the pallet. Then, the self-running vehicle V runs to the leading end of the first conveying path train 70a (shown at the right end in the drawing). At this time, the self-running vehicles V in the first self-running vehicle train 70a are moved forward (i.e., to the left as viewed in the drawing) to the position of one vehicle ahead, respectively. The individual workers Wa assemble parts in charge of them. The same operations are performed in the second conveying route R22, the second self-running vehicle train 70b, the third conveying route R23 and the third self-running vehicle train 70c.

When each self-running vehicle V arrives at the trailing end of the third self-running vehicle train 70c, the last parts are assembled on the engine base (work). In this way, all the necessary parts are assembled to complete the engine.

The self-running vehicle V then runs along the fourth conveying route R24 to the engine testing yard OUT. There, the engine is taken out of the pallet, and the vehicle V returns with the empty pallet thereon to the engine base supplying section noted above.

In this embodiment, unlike the first and second embodiments, the self-running vehicle trains 70a to 70c each constituted by a train of self-running vehicles V are used in lieu of roller conveyors as the conveying path divisions. In other words, it is not necessary to install any roller conveyor. Besides, it is possible to readily change the specifications of the conveying path, i.e., the number of self-running vehicle trains (70), the arrangement thereof (i.e., arrangement of the trains either in series or in parallel), and the number of self-running vehicles V in each self-running vehicle train (70).

As has been described in the foregoing, according to the invention, it is possible to use only part of a plurality of conveying path divisions for the assembling operation. In this case, the other conveying path divisions may be put to maintenance or used for assembling different types of products.

Moreover, the workers do not have to procure parts to be assembled by themselves and can devote all their efforts only to the assembling operation to improve the assembling operation efficiency.

While the invention has been described with reference to the preferred embodiments thereof, it is to be understood that modifications or variations may be easily made without departing from the scope of the present invention which is defined by the appended claims.

What is claimed is:

1. A parts assembling equipment used for production activities of a plurality of workers to assemble a plurality of parts successively on a work and thus obtain a complete product, comprising:

a work and parts conveying path including a plurality of individual conveying path divisions each having a leading end and a trailing end, the individual conveying path divisions being arranged in an order in which the work is conveyed thereto; and a plurality of path division conveying means each for conveying the work with parts assembled thereon in a preceding conveying path division from a trailing end of the preceding conveying path division to a leading end of a succeeding conveying path division and for conveying other parts to be assembled on the work in the succeeding conveying path division;

each said path division conveying means moving in a closed loop including the trailing end of the preceding conveying path division where the work is received, a parts stockyard where a set of parts to be assembled on the work in the succeeding conveying path division are loaded on the path division conveying means, and the leading end of the succeeding conveying path division.

2. The parts assembling equipment according to claim 1, wherein the trailing end of the preceding conveying path division and the leading end of the succeeding conveying path division, are disposed in a closely spaced-apart relation to each other.

3. The parts assembling equipment according to claim 1, wherein the conveying path divisions are disposed in parallel.

4. A parts assembling equipment used for production activities of a plurality of workers to assemble a plurality of parts successively on a work and thus obtain a complete product, comprising:

a work and parts conveying path including a plurality of individual conveying path divisions each having a leading end and a trailing end, the individual conveying path divisions being arranged in an order in which the work is conveyed thereto; and a plurality of path division conveying means each for conveying the work with parts assembled thereon in a preceding conveying path division from a trailing end of the preceding conveying path division to a leading end of a succeeding conveying path division and for conveying other parts to be assembled on the work in the succeeding conveying path division;

each of the path division conveying means comprising a self-running vehicle which leaves the trailing end of the preceding conveying path division and arrives at the leading end of the succeeding conveying path division via a parts stockyard.

5. The parts assembling equipment according to claim 4, wherein the self-running vehicle further moves from the leading end of the succeeding conveying path division to the trailing end of the succeeding conveying path division.

6. A parts assembling equipment used for production activities of a plurality of workers to assemble a plurality of parts successively on a work and thus obtain a complete product, comprising:

a work and parts conveying path including a plurality of conveying path divisions each having a leading end and a trailing end, the individual conveying path divisions being arranged in the order in which the work is conveyed thereto; and a plurality of self-running vehicles each for conveying the work through said plurality of conveying path divisions;

each said self-running vehicle leaving the trailing end of each preceding conveying path division and arriving at the leading end of the succeeding conveying path division via a parts stockyard.

7. A parts assembling process in which a plurality of workers assemble a plurality of parts successively on a work along a plurality of conveying path divisions each having a leading end and a trailing end and thus obtain a complete product, said process comprising the steps of:

providing a plurality of path division conveying means each for conveying the work with parts assembled thereon in a preceding conveying path division from a trailing end of the preceding conveying path division to a leading end of a succeeding conveying path division and for conveying other parts to be assembled on the work in the succeeding conveying path division;

moving each said path division conveying means in a closed loop including the trailing end of the preceding conveying path division; a parts stockyard, and the leading end of the succeeding conveying path division;

supplying the work to each path division conveying means at the trailing end of the preceding conveying path division;

loading onto each path the division conveying means at the parts stockyard a set of parts to be assembled on the work in the succeeding conveying path division; and assembling the set of parts on the work at the succeeding conveying path division.

8. A parts assembling process in which a plurality of workers assemble a plurality of parts successively on a work along a plurality of conveying path divisions each having a leading end and a trailing end, and thus obtain a complete product, said process comprising the steps of:

providing a plurality of path division conveying means each for conveying the work with parts assembled thereon in a preceding conveying path division from a trailing end of the preceding conveying path division to a leading end of a succeeding conveying path division and for conveying other parts to be assembled on the work in the succeeding conveying path division, each said path division conveying means comprising a self-running vehicle;

supplying the work to each self-running vehicle at the trailing end of the preceding conveying path division;

moving each self-running vehicle from the trailing end of the preceding conveying path division to a parts stockyard;

loading onto each self-running vehicle at the parts stockyard a set of parts to be assembled on the work in the succeeding conveying path division;

moving each self-running vehicle to the leading end of the succeeding conveying path division; and assembling the set of parts on the work at the succeeding conveying path division.

9. A parts assembling process according to claim 8 further including the step of moving each self-running vehicle from the leading end of the succeeding conveying path division to the trailing end of the succeeding conveying path division.

10. A parts assembling process in which a plurality of workers assemble a plurality of parts successively on a work and thus obtain a complete product, comprising:

(a) providing a plurality of self-running vehicles each for conveying the work through a plurality of conveying path divisions each having a leading end and a trailing end;

(b) supplying the work to each self-running vehicle; and (c) moving each self-running vehicle successively through said plurality of conveying path divisions;

said step (c) of moving each self-running vehicle successively through said plurality of conveying path divisions including for each conveying path division the steps of:

moving each self-running vehicle to a parts stockyard;

loading onto each self-running vehicle at the parts stockyard a respective set of parts to be assembled on the respective work in the succeeding conveying path division;

moving each self-running vehicle to the leading end of the succeeding conveying path division and along the succeeding conveying path division; and assembling the respective set of parts on the respective work at the succeeding conveying path division.

\* \* \* \* \*